(12) United States Patent
Frodé

(10) Patent No.: US 11,964,732 B2
(45) Date of Patent: Apr. 23, 2024

(54) MARINE SURFACE VESSEL COMPRISING AN AIR VENTILATED HULL

(71) Applicant: FRODÉ MARINA AB, Vaxholm (SE)

(72) Inventor: Mikael Frodé, Vaxholm (SE)

(73) Assignee: FRODE MARINA AB, Vaxholm (SE)

( * ) Notice: Subject to any disclaimer, the term of this patent is extended or adjusted under 35 U.S.C. 154(b) by 177 days.

(21) Appl. No.: 17/272,128

(22) PCT Filed: Sep. 16, 2019

(86) PCT No.: PCT/EP2019/074641
§ 371 (c)(1),
(2) Date: Feb. 26, 2021

(87) PCT Pub. No.: WO2020/058161
PCT Pub. Date: Mar. 26, 2020

(65) Prior Publication Data
US 2021/0339828 A1    Nov. 4, 2021

(30) Foreign Application Priority Data

Sep. 19, 2018  (SE) .................................. 1851111-3

(51) Int. Cl.
*B63B 1/38*    (2006.01)
*B63B 1/20*    (2006.01)
*B63B 13/00*   (2006.01)

(52) U.S. Cl.
CPC ................. *B63B 1/38* (2013.01); *B63B 1/20* (2013.01); *B63B 13/00* (2013.01); *B63B 2001/202* (2013.01); *B63B 2001/387* (2013.01)

(58) Field of Classification Search
CPC .. B63B 1/38; B63B 1/20; B63B 13/00; B63B 2001/202; B63B 2001/387; Y02T 70/10
See application file for complete search history.

(56) References Cited

U.S. PATENT DOCUMENTS

| 3,316,874 A | 5/1967 | Henry |
| 5,111,767 A | 5/1992 | Haines |
| 6,575,106 B1* | 6/2003 | Whitener .................. B63B 1/20 114/291 |
| 6,957,620 B1 | 10/2005 | Wheeler |
| 2008/0149015 A1 | 6/2008 | Carbonel |

FOREIGN PATENT DOCUMENTS

WO    8200812 A1    3/1982

OTHER PUBLICATIONS

International Preliminary Report on Patentability for related PCT/EP2019/074641 dated Jan. 12, 2021.
Search Report in related PCT/EP2019/074641 dated Jul. 11, 2019.

* cited by examiner

*Primary Examiner* — Anthony D Wiest
(74) *Attorney, Agent, or Firm* — Schott, P.C.

(57) ABSTRACT

A marine surface vessel includes an air ventilated hull, and a deck, where the vessel includes at least one air conduit leading to at least one ventilation opening beneath a waterline of the vessel. The at least one air conduit is arranged to guide air to the at least one ventilation opening, where the deck is at least party surrounded by a gunwale, where the at least one air conduit is arranged to guide the air from at least one water drainage opening arranged to drain water from the deck.

7 Claims, 4 Drawing Sheets

MARINE SURFACE VESSEL COMPRISING AN AIR VENTILATED HULL

TECHNICAL FIELD

The invention relates to a marine surface vessel comprising an air ventilated hull.

BACKGROUND

A marine surface vessel comprising an air ventilated hull, may comprise an air conduit leading to ventilation openings at a step of the hull, beneath a waterline of the boat, the air conduit being arranged to guide air to the ventilation opening. Such a solution is known, e.g. from U.S. Pat. No. 3,316,874A. Such a solution may be known as an air ventilated planing hull design, hull step ventilation, or an air vented hull step. The discharge of air from the ventilation opening reduces the surface friction of water against the hull. Thereby, the vessel is enabled to plane more readily. In addition, the vessel may thereby reach higher speeds when the vessel is in a planning position. In addition, the air discharge prevents formation of regions of reduced pressure adjacent the step, thereby further decreasing the drag of the hull.

US2008149015A1 relates to a boat with a V-shaped hull. The boat has a cavity under the deck, which cavity is intended to be waterfilled when the boat is stationary or at slow speed. This increases the stability of the boat. When at high speed, the cavity is emptied through an opening at the bottom of the hull. The cavity is closed at the level of the deck line by a removable panel which is provided with a vent, which avoids air being trapped in the cavity.

U.S. Pat. No. 3,316,874A discloses a boat with an air ventilated hull. An air inlet is formed as a pipe or a conduit extending upwardly from an air chamber through a floor, or the air is drawn from inlets opening through the bow, or through an overhang deck which extends aftwardly from a bow prow.

U.S. Pat. No. 5,111,767A describes a boat with a recess adjacent the transom, and a reservoir, or "venting body", being in fluid communication with the recess and a hull exterior. The space in the reservoir is separated from other areas of the boat interior. It is suggested that during travel of the boat, hull venting of a low pressure area adjacent the recess can take place without water gaining access to the hull interior in the event of hard turning or reversing, "said water being trapped in said hollow venting body or reservoir".

WO8200812A1 describes a boat with an air conduit guiding air from an opening on lateral side of a superstructure, to inject air under a rear part of the hull.

U.S. Pat. No. 6,957,620B1 describes a boat which is intended to have an air chamber under the hull thereof. The air chamber is delimited by side rails, and arranged to be air fed by an air intake scoop and an airflow passageway. A one-way valve is mounted in the airflow passageway to prevent a reverse direction airflow.

Planing marine surface vessels operating at, e.g. at relatively high seas, will be provided with a draining system for removing water entering a deck of the vessel. There is a desire to simplify vessels with air ventilated hulls, and draining systems.

SUMMARY

An object of the invention is to simplify vessels with air ventilated hulls, and draining systems.

The objects are achieved by a vessel according to according to claim 1. Thus, the objects are achieved by a marine surface vessel comprising an air ventilated hull, and a deck, wherein the vessel comprises at least one air conduit leading to at least one ventilation opening beneath a waterline of the vessel, the at least one air conduit being arranged to guide air to the at least one ventilation opening, wherein the deck is at least party surrounded by a gunwale, wherein the at least one air conduit is arranged to guide the air from at least one water drainage opening arranged to drain water from the deck.

The water drainage opening may allow for draining water on the deck. The deck may be at least party surrounded by a gunwale. The deck may be uncovered. The water may have splashed over the gunwale onto the deck. The water drainage opening may be located above a waterline of the vessel. The vessel may be a planing vessel. The invention provides for water to be drained from the deck, through the water drainage opening, through the air conduit, and through the ventilation opening. The invention further provides for air to be guided through the water drainage opening, through the air conduit, and through the ventilation opening. The invention provides for the air conduit providing the combined functions for hull air ventilation and for deck water draining. Thereby vessels with air ventilated hulls, and draining systems, may be simplified. For example, no separate conduit and outlet for the draining system is required. The ventilation opening may be provided at a step of the vessel hull. The at least one ventilation opening may be provided at at least one step of the vessel hull. A sub-pressure region, or vacuum, forming at the step when the vessel is planing may serve to effectively pump water from the deck, via the air conduit. Thereby, an automatic draining of the deck may be provided. The water draining through the air conduit may be provided also when the vessel is not moving.

Since the deck may be is at least party surrounded by a gunwale, and since the at least one water drainage opening is arranged to drain water from the deck, water splashed over the gunwale, and down on the deck can be discharged through the air conduit. Open boats, such as rib boats, can receive large amounts of water over the gunwale in severe weather, e,g. at open sea. The deck at least party surrounded by a gunwale may also be referred to as a floor. Thus, the invention allow an effective deck drainage function, and a hull ventilation function, to share an inlet, a conduit and an outlet. This simplifies the vessel.

It should be noted that the ventilation opening is provided for air ventilation of the hull. The air ventilated hull is, in preferred embodiments, arranged so that, during a planing progress of the vessel, the hull is, in front of, as well as aft of, the ventilation opening, submerged in the water. Aft of the ventilation opening, the air provided by the ventilation opening, may be in contact with the submerged portion of the hull, aft of the ventilation opening. Thus, aft of the ventilation opening, the hull may be in contact with the water, as well as air from the ventilation hull. A drainage opening in a vessel transom, aft of which there is no contact of the hull with the water, would not be considered to be a ventilation opening in a vessel according to embodiments of the invention.

There may be one or more water drainage openings. The water drainage opening(s) may be of any suitable size. The water drainage opening(s) may be of any suitable shape, e.g. circular. In some embodiments, the vessel could be provided with 5-15, e.g. 10-12, circular water drainage openings, each with a diameter of 20-200 mm, e.g. 25 mm.

Preferably, the water drainage opening is located at the lowest part of the deck. Herein the lowest part of the deck is understood as a part of the deck, which is lowest when the vessel is not moving. The lowest part of the deck may be understood as a part of the deck, which is lowest when the vessel is unloaded. For example, where the deck is non-horizontal, or non-planar, e.g. curved, or formed from sections, where adjacent sections are oriented in a non-zero angle to each other, the water drainage opening is preferably located at the lowest part of the deck. Where the deck is planar, and horizontal, the lowest part of the deck may extend throughout the entire deck.

The water drainage opening is preferably located closer to the deck than to an upper edge of the gunwale. For example, where the deck is essentially planar, the water drainage opening is located closer to the deck than to an upper edge of the gunwale. More generally, the water drainage opening is preferably located below upper edge of the gunwale.

Preferably, at least one of the at least one water drainage opening is provided in a steering console of the vessel. Thereby, the water drainage opening may be located in a forwards facing surface of the console. Thereby, the water drainage opening is well located to take in water running aftwards of the deck. Such water motion is common of planing vessels. Also, the water drainage opening may be provided close to the deck, but not in it. Thereby, the risk of damage of the opening, e.g. by vessel crew members stepping on it, may be reduced.

Preferably, the vessel comprises one or more non-return valves arranged to prevent water from being transported through the at least one air conduit from the at least one ventilation opening to the at least one water drainage opening. Preferably, a non-return valve is provided at a respective of the at least one ventilation opening. Thereby, water may be prevented from flowing into the air conduit via the ventilation opening, when the vessel is reversed. This may prevent water from entering the deck via the air conduit. It should be noted that in some embodiments, one or more non-return valves may be arranged in the at least one air conduit, for example between the at least one ventilation opening and the at least one water drainage opening.

A marine surface vessel may comprise an air ventilated hull, wherein the vessel comprises at least one air conduit leading to at least one ventilation opening beneath a waterline of the vessel, the air conduit being arranged to guide air to the at least one ventilation opening, wherein the vessel comprises one or more non-return valves arranged to prevent water from being transported through the at least one air conduit from the at least one ventilation opening. In some embodiments, a non-return valve is provided at a respective of the at least one ventilation opening. The ventilation opening may be provided in an aftwards facing surface of a step of the hull. The air conduit may be arranged to guide the air from at least one air intake opening. The at least one air intake opening may be at least one water drainage opening arranged to drain water from the deck. By means of the non-return valve, water may be prevented from flowing into the air conduit via the ventilation opening, when the vessel is reversed.

Further advantages and advantageous features of the invention are disclosed in the following description and in the dependent claims.

BRIEF DESCRIPTION OF THE DRAWINGS

Below, embodiments of the invention will be described with reference to the drawings, in which.

DETAILED DESCRIPTION OF EMBODIMENTS OF THE INVENTION

Figure 1:
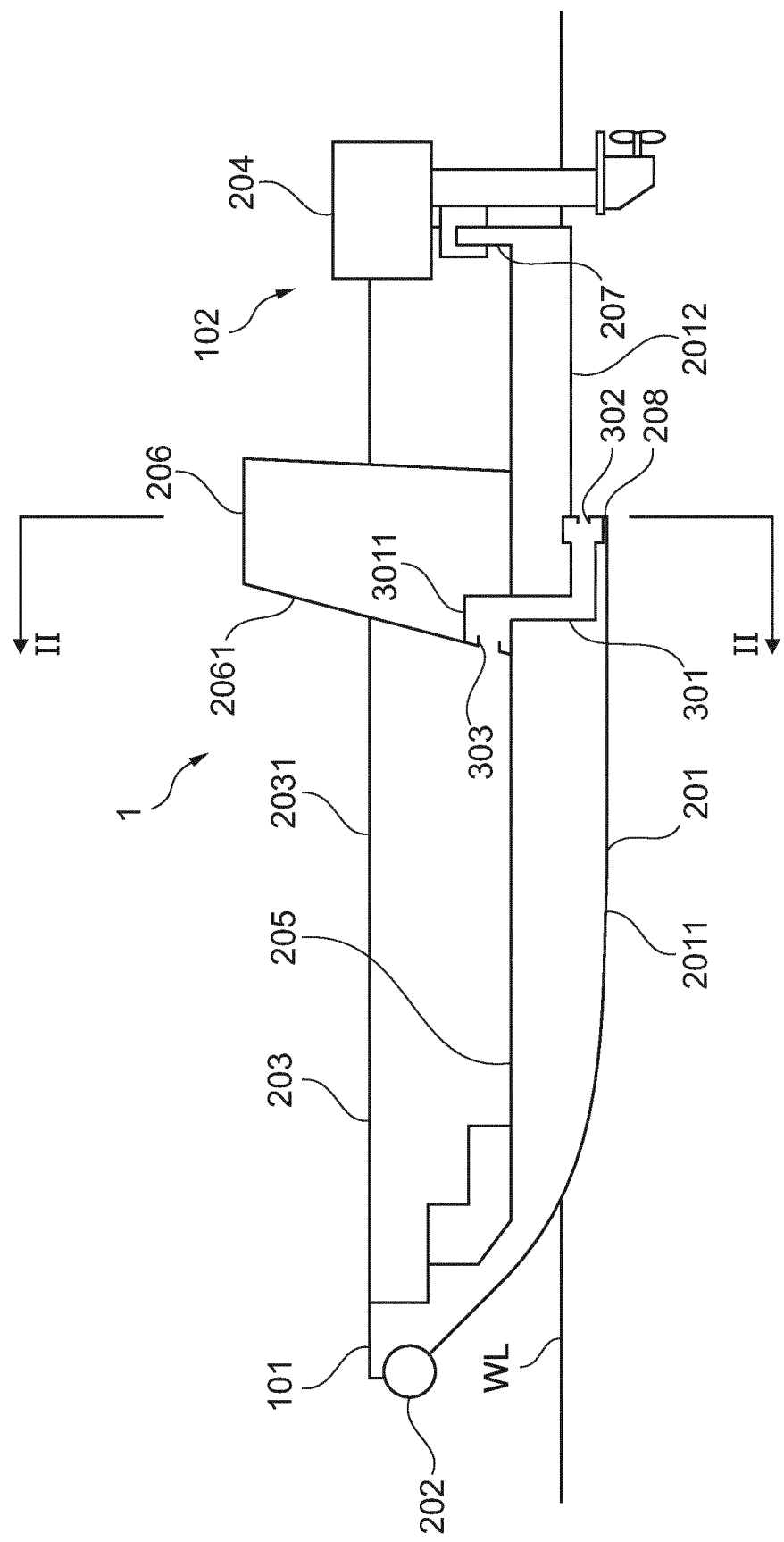
FIG. 1 shows a vertical cross-section of a marine surface vessel, the cross-section coinciding with a longitudinal axis of the vessel.

FIG. 1 shows a longitudinal, vertical section of a marine surface vessel in the form of a rigid-inflatable boat (RIB). Herein a longitudinal axis of the vessel is understood as an axis which is parallel to a direction of straight travel of the vessel. The vessel in FIG. 1 comprises a solid, shaped hull 201 and flexible tubes 202 at a gunwale 203. The hull 201 may be made in any suitable material, such as steel, wood, aluminium, or fibre-reinforced plastic, such as glass-reinforced plastic (GRP) composite, or carbon reinforced plastic. The hull may comprise a single skin, or it can be a sandwich construction. The hull 201 may be any of a variety of types, e.g. a "deep-V hull", a "shallow-V" hull, a catamaran hull, or a trimaran hull.

The vessel further comprises a deck 205. The vessel is an open vessel, and the deck 205 is uncovered. The deck 205 is partly surrounded by a gunwale 203. The gunwale 203 reaches along the sides of the vessel, and around the bow 101. At the stern 102, an outboard engine mounting board 207 is provided. The mounting board 207 joins port and starboard stern end regions of the gunwale 203. One or more outboard engines 204 are mounted on the mounting board 207. Thus, the deck 205 is surrounded by the gunwale 203 and the mounting board 207.

In the example shown in FIG. 1, the solid hull 201 reaches to the top of the tubes 202. Thereby, the solid hull 201 forms an internal part of the gunwale 203. Hence, only a forward end of the tubes 202 are visible in the cross-section of FIG. 1. The tubes 202 are provided outside of the solid hull, along the sides thereof. The tubes 202 may be joined at the bow 101.

It should be noted that the invention is equally applicable to alternative types of vessels. For example, the vessel may have a fully rigid hull. The vessel may have one or more inboard engines.

The vessel further comprises a steering console 206. The console 206 is in this embodiment surrounded by the deck 205. In alternative embodiments, the console may reach laterally up to the gunwale 203. Thereby, a deck may be provided in front of the console 206, and another deck may be provided behind the console 206. The steering console comprises control devices for a driver of the vessel, such as a steering wheel, engine control devices, and instruments. The console 206 may further house equipment for the vessel, or for a mission of the vessel.

The vessel is a planning boat. The vessel hull 201 comprises a step 208. The step 208 extends laterally on the hull. The vessel comprises an air ventilated hull. For this, the vessel comprises an air conduit 301 leading to a plurality of ventilation openings 302. The ventilation openings 302 are provided beneath the waterline WL of the vessel. The air conduit 301 is arranged to guide air to the ventilation openings 302.

The air conduit 301 is arranged to guide the air from water drainage openings 303. The water drainage openings are arranged to drain water from the deck 205. The water may have splashed over the gunwale 203 onto the deck 205. The water drainage openings 303 are provided above the waterline WL. The water drainage openings 303 are provided in the console 206. The water drainage openings 303 are provided in a forward facing surface 2061 of the console 206. The water drainage openings 303 are located at the deck 205. The water drainage openings 303 are located close to the deck 205. Thereby, the water drainage opening 303 are located closer to deck 205 than to an upper edge 2031 of the gunwale 203.

In the example described here, the deck 205 is substantially planar. In some embodiments where the deck 205 is non-horizontal, or non-planar, e.g. curved, or formed from sections, where adjacent sections are oriented in a non-zero angle to each other, the water drainage opening 303 are preferably located at a lowest part of deck.

The discharge of air from the ventilation openings 302, which air is introduced through the water drainage openings 303, reduces the surface friction of water against the hull. Thereby, the vessel is enabled to plane more readily. In addition, the vessel may thereby reach higher speeds when the vessel is in a planning position. In addition, the air discharge prevents formation of regions of reduced pressure adjacent the step, thereby further decreasing the drag of the hull. Further, embodiments of the invention provide for draining of water on the deck 205 through the ventilation openings 302.

Figure 2:
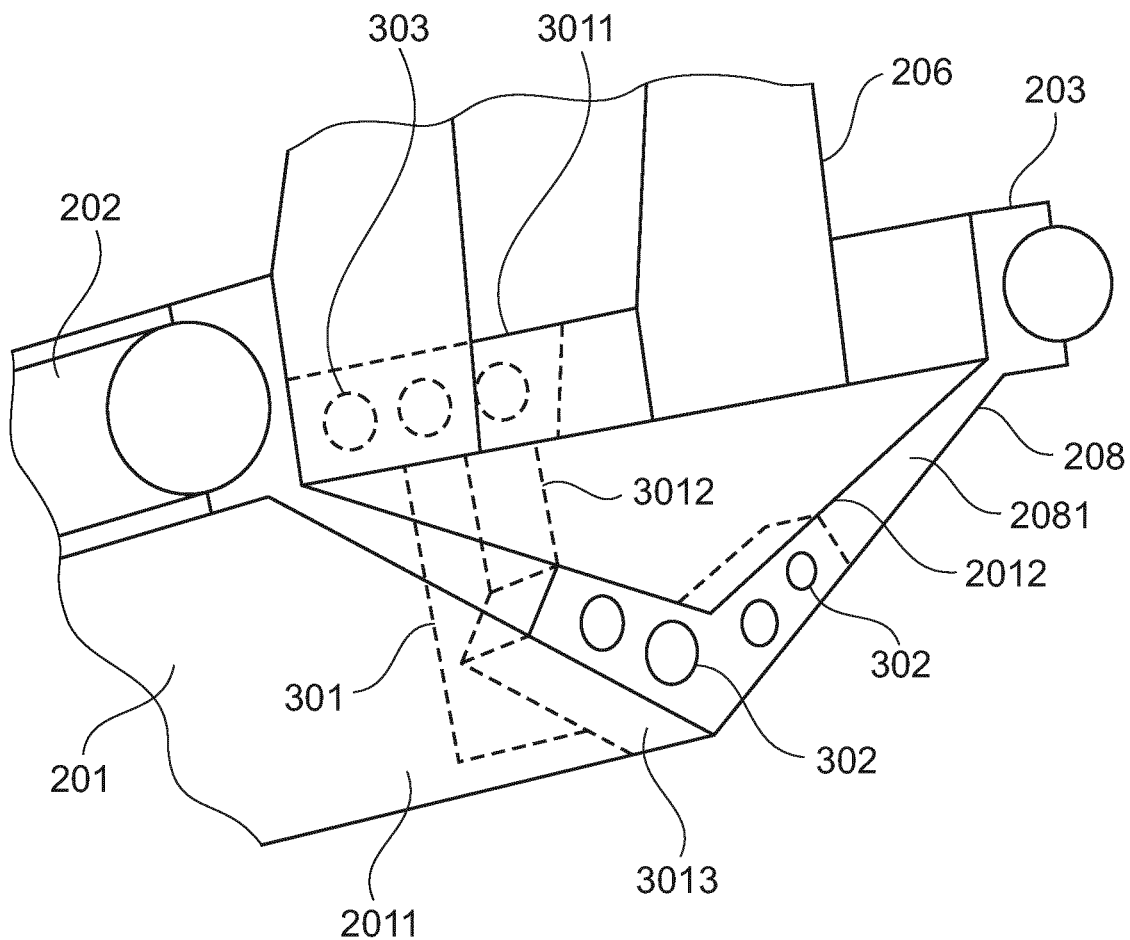
FIG. 2 shows a perspective view of a cross-section of the vessel in FIG. 1, the cross-section being oriented as indicated by the arrows II-II in FIG. 1, wherein some hidden parts are indicated with broken lines.

Reference is made also to FIG. 2. The step 208 comprises a vertical surface 2081 connecting a surface 2011 forward of the step 208 with a surface 2012 aft of the step 208. As can also be seen in FIG. 1, the surface 2012 aft of the step is recessed so as to be shallower than the surface 2011 forward of the step 208. Thus, the vertical surface 2081 forms an aftwards facing surface. In this example, the surface 2012 aft of the step 208 has a V-shape which is less deep than the V-shape of the surface 2011 forward of the step 208. This can be seen in FIG. 2. Said difference in V-shape may reduce a planing threshold speed of the vessel.

As can be seen in FIG. 2, in this example, the vessel comprises four ventilation openings 302. The ventilation openings 302 are provided in the vertical surface 2081 of the step.

Further, in this example, three water drainage openings 303 are provided in the console 206. The air conduit 301 comprises a first chamber 3011 on the inner side of the console, (see also FIG. 1). The water drainage openings 303 lead into the first chamber 3011. The first chamber 3011 leads into a connection conduit 3012. The connection 3012 leads into a second chamber 3013. The second chamber 3013 is provided at the step 208. The ventilation openings 302 lead out of the second chamber 3013.

Figure 3:
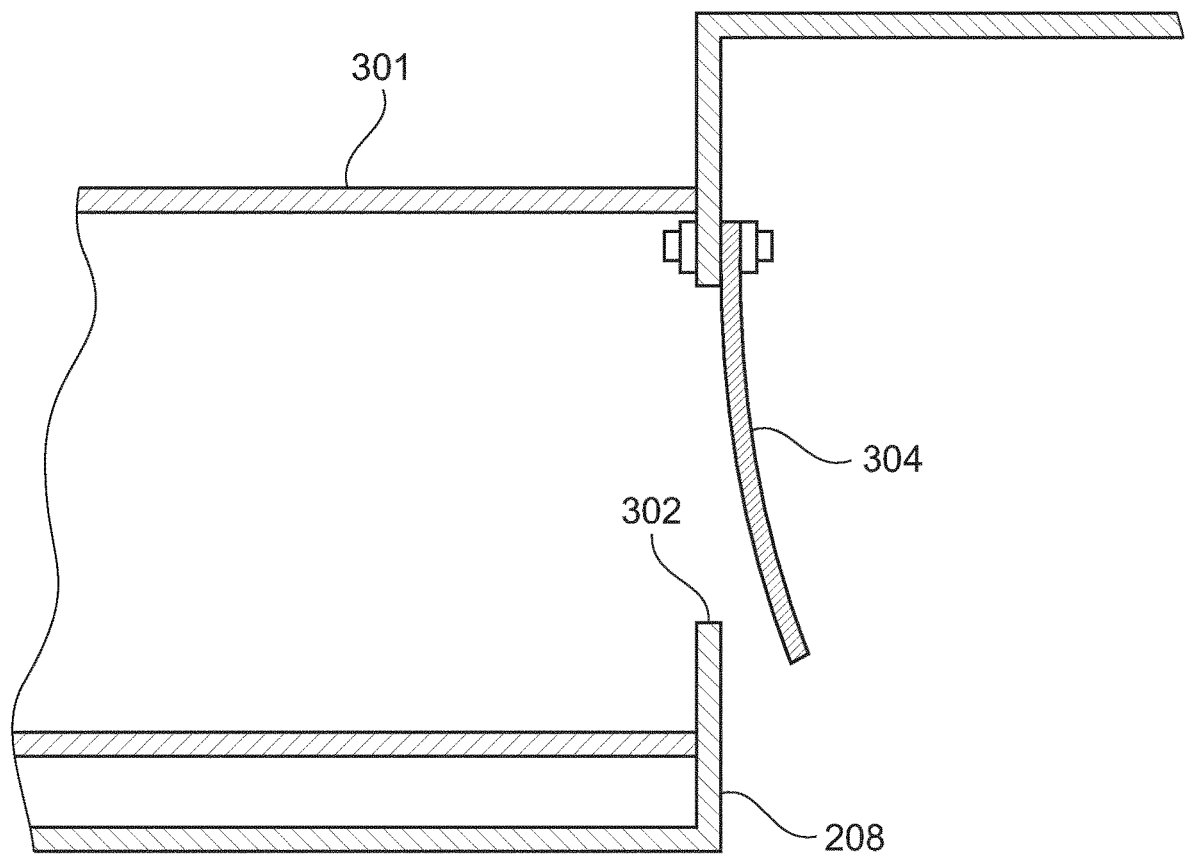
FIG. 3 shows a vertical cross-section of a part of a hull of a marine surface vessel according to an alternative embodiment of the invention.

Reference is made to FIG. 3. In some embodiments, a non-return valve 304 may be provided at a respective of the ventilation openings 302. Each non-return valve 304 may be provided as a rubber flap 304. In alternative embodiments, each non-return valve may be provided as a hinged, stiff flap, e.g. in metal or plastic. The non-return valves 304 prevent water from entering the air conduit 301 when the vessel is reversed.

Figure 4:
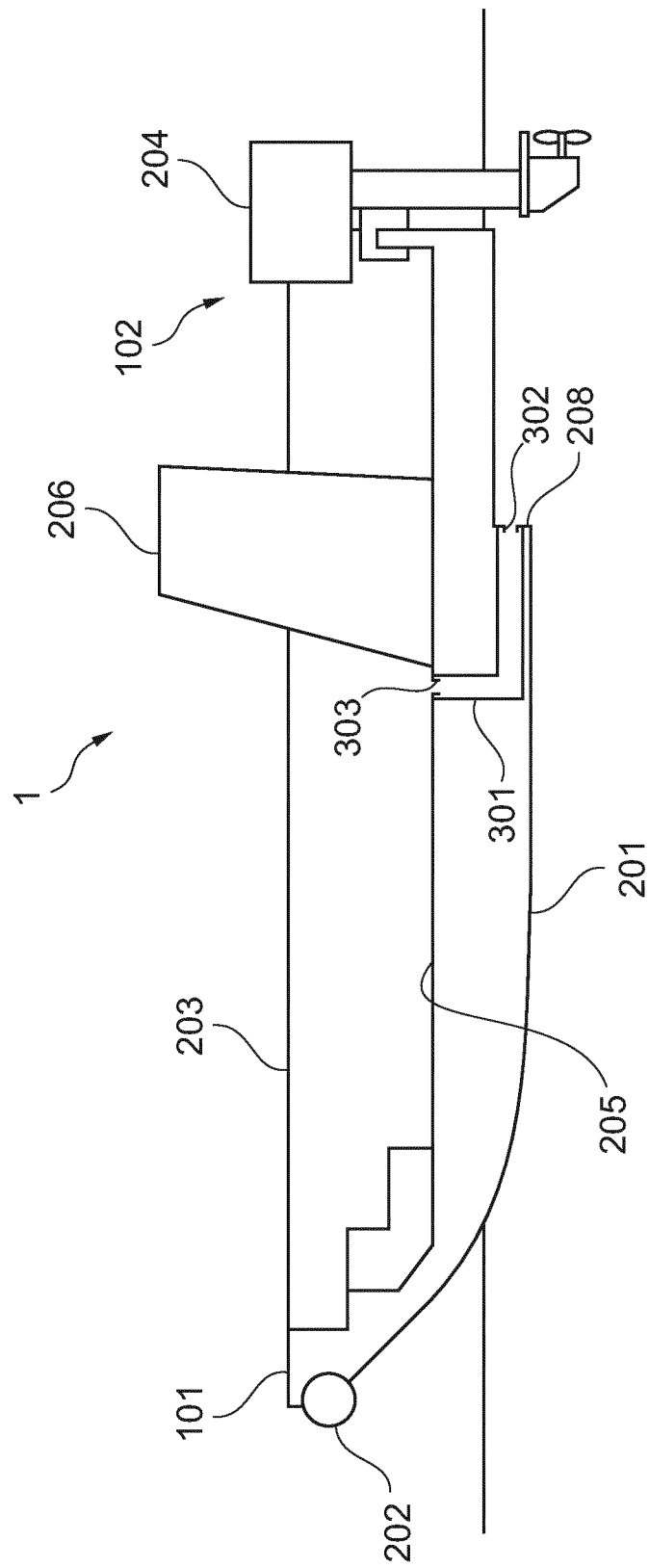
FIG. 4 shows a view, similar to the one in FIG. 1, of a marine surface vessel according to a further embodiment of the invention.

Reference is made to FIG. 4, showing an alternative embodiment of the invention. The vessel 1 in FIG. 4 has the same features as the one described with reference to FIG. 1 and FIG. 2, except for the following difference: The air drainage openings 303 are provided in the deck 5.

It is to be understood that the present invention is not limited to the embodiments described above and illustrated in the drawings; rather, the skilled person will recognize that many changes and modifications may be made within the scope of the appended claims.

I claim:

1. A marine surface vessel comprising an air ventilated hull, and a deck, wherein the vessel comprises at least one air conduit leading to at least one ventilation opening beneath a waterline of the vessel, the at least one air conduit being arranged to guide air to the at least one ventilation opening, the at least one ventilation opening being provided for air ventilation of the hull, wherein the deck is at least partly surrounded by a gunwale, wherein the at least one air conduit is arranged to guide the air from at least one water drainage opening, wherein the at least one water drainage opening is arranged to drain water from the deck, wherein the water drainage opening is located at a lowest part of the deck, the vessel comprising one or more non-return valves arranged to prevent water from being transported through the at least one air conduit from the at least one ventilation opening to the at least one water drainage opening.

2. A marine surface vessel according to claim 1, wherein at least one of the at least one water drainage opening is provided in a steering console of the vessel.

3. A marine surface vessel according to claim 1, wherein a non-return valve is provided at a respective end of the at least one ventilation opening.

4. A marine surface vessel according to claim 1, wherein the air ventilated hull is arranged so that, during a planing progress of the vessel, the hull is, in front of, as well as aft of, the at least one ventilation opening, submerged in the water.

5. A marine surface vessel according to claim 1, wherein the at least one ventilation opening is provided at at least one step of the vessel hull.

6. A marine surface vessel comprising:
    an air ventilated hull;
    a deck;
    at least one air conduit leading to at least one ventilation opening beneath a waterline of the vessel, the at least one air conduit being arranged to guide air to the at least one ventilation opening, the at least one ventilation opening being provided for air ventilation of the hull;
    wherein the deck is at least partly surrounded by a gunwale;
    wherein the at least one air conduit is arranged to guide the air from at least one water drainage opening;
    wherein the at least one water drainage opening is arranged to drain water from the deck;
    wherein the at least one water drainage opening is provided in a non-horizontal surface;
    wherein the vessel further comprises one or more non-return valves arranged to prevent water from being transported through the at least one air conduit from the at least one ventilation opening to the at least one water drainage opening.

7. A marine surface vessel according to claim 6, wherein the at least one water drainage opening is provided in a vertical surface.

* * * * *